(12) United States Patent
Tadokoro (10) Patent No.: US 11,942,115 B2
(45) Date of Patent: Mar. 26, 2024

(54) VIDEO EDITING DEVICE, VIDEO EDITING METHOD, AND COMPUTER PROGRAM

(71) Applicant: GENEVIS INC., Tokyo (JP)

(72) Inventor: Takashi Tadokoro, Tokyo (JP)

( * ) Notice: Subject to any disclaimer, the term of this patent is extended or adjusted under 35 U.S.C. 154(b) by 0 days.

(21) Appl. No.: 18/001,108

(22) PCT Filed: Feb. 3, 2022

(86) PCT No.: PCT/JP2022/004267
§ 371 (c)(1),
(2) Date: Dec. 8, 2022

(87) PCT Pub. No.: WO2022/176633
PCT Pub. Date: Aug. 25, 2022

(65) Prior Publication Data
US 2023/0215468 A1 Jul. 6, 2023

(30) Foreign Application Priority Data
Feb. 19, 2021 (JP) ................................. 2021-025637

(51) Int. Cl.
*G11B 27/031* (2006.01)
*G06V 20/40* (2022.01)
(Continued)

(52) U.S. Cl.
CPC ............ *G11B 27/031* (2013.01); *G06V 20/46* (2022.01); *G06V 40/161* (2022.01); *G11B 27/34* (2013.01)

(58) Field of Classification Search
CPC ...... G11B 27/031; G11B 27/34; G06V 20/46; G06V 40/161
(Continued)

(56) References Cited

U.S. PATENT DOCUMENTS 7,956,900 B2   6/2011 Naoto
8,914,389 B2   12/2014 Nagasaka
(Continued)

FOREIGN PATENT DOCUMENTS

CN   101193249 A   6/2008
JP   2002016871 A   1/2002
(Continued)

OTHER PUBLICATIONS

Decision of Refusal for corresponding JP Application No. 2021-025637, 2 pages, dated Feb. 18, 2022.
(Continued)

*Primary Examiner* — Loi H Tran
(74) *Attorney, Agent, or Firm* — Matthew B. Dernier, Esq.

(57) ABSTRACT

A video editing device includes: a video storage unit for storing in an unedited state a plurality of raw videos obtained by capturing videos of one event by a plurality of video capturing devices and used for creation of a video work relating to the event; and an editing unit for creating an edited video relating to the event through use of the plurality of raw videos as requested by a user. The editing unit is configured to: add metadata that allows content appearing in each scene to be indicated to each of the plurality of raw videos stored in the video storage unit; calculate, when an editing standard is input from outside, degrees of matching between the editing standard and the plurality of raw videos based on the metadata; and create the edited video through use of some of the plurality of raw videos extracted based on the degrees of matching.

9 Claims, 9 Drawing Sheets

(51) Int. Cl.
    *G06V 40/16*     (2022.01)
    *G11B 27/34*     (2006.01)

(58) Field of Classification Search
    USPC ........................................................ 386/278
    See application file for complete search history.

(56) References Cited

U.S. PATENT DOCUMENTS

| | | | |
|---|---|---|---|
| 9,264,765 B2 | 2/2016 | Sasaki | |
| 2008/0028318 A1 | 1/2008 | Shikuma | |
| 2008/0123966 A1 | 5/2008 | Nishida | |
| 2009/0300036 A1 | 12/2009 | Hideo | |
| 2010/0189408 A1 | 7/2010 | Naoto | |
| 2014/0245367 A1 | 8/2014 | Sasaki | |
| 2019/0076741 A1* | 3/2019 | Thompson | ....... H04N 21/21805 |
| 2020/0053395 A1 | 2/2020 | Mukaiyama | |
| 2022/0172586 A1* | 6/2022 | San Pedro | ....... G08B 13/19671 |

FOREIGN PATENT DOCUMENTS

| | | |
|---|---|---|
| JP | 2003134446 A | 5/2003 |
| JP | 2009296159 A | 12/2009 |
| JP | 2010232813 A | 10/2010 |
| JP | 2010232814 A | 10/2010 |
| JP | 2012195811 A | 10/2012 |
| JP | 2018117312 A | 7/2018 |
| JP | 2019169851 A | 10/2019 |
| KR | 1020120018115 A | 2/2012 |
| WO | 2006129496 A1 | 12/2006 |
| WO | 2014024475 A1 | 2/2014 |
| WO | 2015125815 A1 | 8/2015 |

OTHER PUBLICATIONS

Decision of Dismissal of Amendment for corresponding JP Application No. 2021-025637, 9 pages, dated Feb. 18, 2022.
First Office Action for corresponding CN Application No. 202280004882.1, 8 pages dated Jul. 21, 2023.
Request for the Submission of an Opinion for corresponding KR Application No. 10-2023-7011287, 10 pages dated May 26, 2023.
International Search Report for corresponding PCT Application No. PCT/JP2022/004267, 4 pages, dated Mar. 8, 2022.

\* cited by examiner

| EVENT ID | CAMERA ID1 | RAW VIDEO |
| | CAMERA ID2 | RAW VIDEO |
| | CAMERA ID3 | RAW VIDEO |
| | ⋮ | ⋮ |

(b)

| EVENT ID | SOUND |

(c)

| USER ID | PERSONAL INFORMATION | EDITED VIDEO ID | PREFERENCE DATA |

(d)

| EDITED VIDEO ID | EDITED VIDEO |

| DATE OF EVENT TO BE HELD | EVENT NAME |
|---|---|
| YYYY.MM.DD | ○○ CONCERT |
| YYYY.MM.DD | ×× CONCERT |
| ⋮ | ⋮ |

VIDEO EDITING DEVICE, VIDEO EDITING METHOD, AND COMPUTER PROGRAM

TECHNICAL FIELD

The present disclosure relates to a video editing device for editing a plurality of videos used for creation of a commercial video work to create another video.

BACKGROUND ART

In a case of commercializing an event such as a concert as a video work, videos captured from various angles by a plurality of, for example, about 30 video cameras are often edited to produce a single video work. A video that has not been edited is called "raw video." The video work is recorded on a recording medium to be sold or distributed. The commercial video work is usually created by selecting and editing a plurality of raw videos obtained from a plurality of video cameras into one video based on a specific editing standard, for example, a professional standard that suits a specific purpose. There is also a device in which a predetermined scenario is created before video capturing and raw videos are automatically edited based on this scenario. In Patent Literature 1, there is disclosed a technology for creating a video work by editing captured materials based on a scenario.

CITATION LIST

Patent Literature

[PTL 1] JP 2002-016871 A

SUMMARY OF INVENTION

Technical Problem

A plurality of raw videos obtained from a plurality of video cameras have unused parts other than video parts to compose a video work. The raw videos that are not used in any video work never see the light of day, and are usually kept idle. However, from the point of view of users, parts of the raw videos that are not included in the video work may include videos desired by the users. Under the present circumstances, there are provided no services that enable parts of the raw videos that are not included in the video work to become available to users.

In view of the above-mentioned problem, the present disclosure has an object to provide a video editing device that allows a user to edit raw videos to create a unique video work.

Solution to Problem

According to one embodiment of the present disclosure, there is provided a video editing device including: a video storage unit for storing in an unedited state a plurality of raw videos obtained by capturing videos of one event by a plurality of video capturing devices and used for creation of a video work of the one event; and an editing unit for creating an edited video of the one event through use of the plurality of raw videos as requested by a user, wherein the editing unit is configured to: add metadata that allows content appearing in each scene to be indicated to each of the plurality of raw videos stored in the video storage unit; calculate, when an editing standard is input from outside, degrees of matching between the editing standard and the plurality of raw videos based on the metadata; and create the edited video through use of some of the plurality of raw videos extracted based on the degrees of matching.

Advantageous Effects of Invention

According to the present disclosure, the user can create a unique video work by causing raw videos that have not been used under a first editing standard to be edited under a second editing standard.

DESCRIPTION OF EMBODIMENTS

Now, description is given of an embodiment of the present disclosure with reference to the drawings.

<Overall Configuration>

Figure 1:
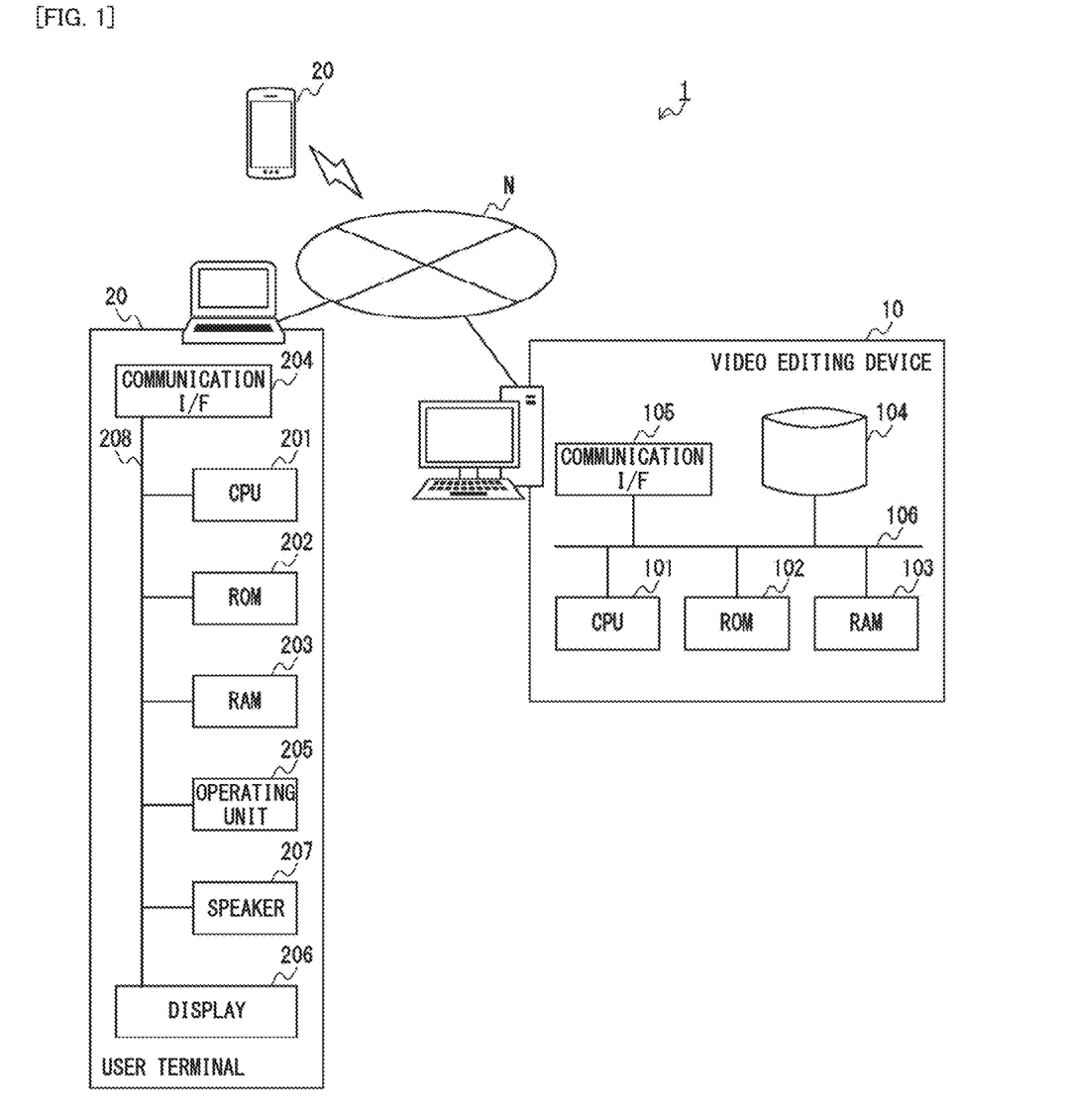
FIG. 1 is an explanatory diagram of a configuration of a video editing system.

FIG. 1 is an explanatory diagram of a configuration of a video editing system including a video editing device to which the present disclosure is applied. This video editing system 1 has a configuration in which a video editing device 10 and a user terminal 20 can communicate to/from each other through a network N. The video editing device 10 is a server that stores a plurality of pieces of video data. The user terminal 20 is an information processing terminal, such as a personal computer, a smartphone, or a tablet terminal, which can be operated under user's own control. There are two user terminals 20 illustrated in FIG. 1, but the number of user terminals 20 can be freely selected, and may be one or three or more.

The video editing device 10 includes computer components including a central processing unit (CPU) 101, a read only memory (ROM) 102, a random access memory (RAM) 103, and a storage 104, and a communication interface (I/F) 105. The computer components and the communication I/F 105 are connected to each other so as to enable communication therebetween through a bus 106. The CPU 101 controls an operation of the video editing device 10 by executing a computer program stored in the ROM 102. The RAM 103 provides a work area to be used when the CPU 101 executes processing.

The storage 104 is a large capacity storage device such as a hard disk drive (HDD) or a solid state drive (SSD). The storage 104 stores a plurality of pieces of video data including raw videos obtained by capturing videos of performers (artists) in events such as concerts and plays. The storage 104 also stores audio data including sounds collected in the events in which the plurality of pieces of video data were obtained. The communication interface 105 performs communication in accordance with a communication protocol of the network N to/from the user terminal 20.

The user terminal 20 includes a CPU 201, a ROM 202, a RAM 203, a communication interface (I/F) 204, an operating unit 205, a display 206, and a speaker 207. Those components are connected to each other so as to enable communication therebetween through a bus 208. The CPU 201 controls an operation of the user terminal 20 by executing a computer program stored in the ROM 202. The RAM 203 provides a work area to be used when the CPU 201 executes processing.

The operating unit 205 is an input interface, and receives various kinds of operation input from the user, which are described later. The received operation input includes, for example, an instruction for editing the plurality of pieces of video data stored in the video editing device 10 and an instruction for other information processing. An instruction input through the operating unit 205 is transmitted to the CPU 201. The CPU 201 performs information processing corresponding to the instruction obtained from the operating unit 205. Under the control of the CPU 201, the display 206 displays an input screen to be used when an instruction is input by the user and a video acquired from the video editing device 10. Under the control of the CPU 201, the speaker 207 outputs a sound acquired from the video editing device 10. The communication interface 204 performs communication in accordance with the communication protocol of the network N to/from the video editing device 10.

In the video editing system 1 having the above-mentioned configuration, the user terminal 20 generates an editing instruction including an editing standard based on a preference of the user, in response to details of an instruction input from the operating unit 205. The user terminal 20 causes the communication interface 204 to transmit the generated editing instruction to the video editing device 10 through the network N.

The video editing device 10 causes the communication interface 105 to acquire the editing instruction transmitted from the user terminal 20. The video editing device 10 edits the plurality of pieces of video data in the storage 104 based on the acquired editing instruction to generate edited video data, which represents one edited video. The video editing device 10 causes the communication interface 105 to transmit the edited video data and audio data synchronized with the edited video data to the user terminal 20 through the network N.

The user terminal 20 causes the communication interface 204 to acquire the edited video data and the audio data that have been transmitted from the video editing device 10. The user terminal 20 displays the edited video obtained by processing the acquired edited video data on the display 206, and outputs the sound obtained by processing the acquired audio data from the speaker 207. In this manner, the user of the user terminal 20 can play (or view) the video and listen to the sound in accordance with the user's own preference.

Next, the video editing device 10 and the user terminal 20 are described in detail.

<Video Editing Device>

Figure 2:
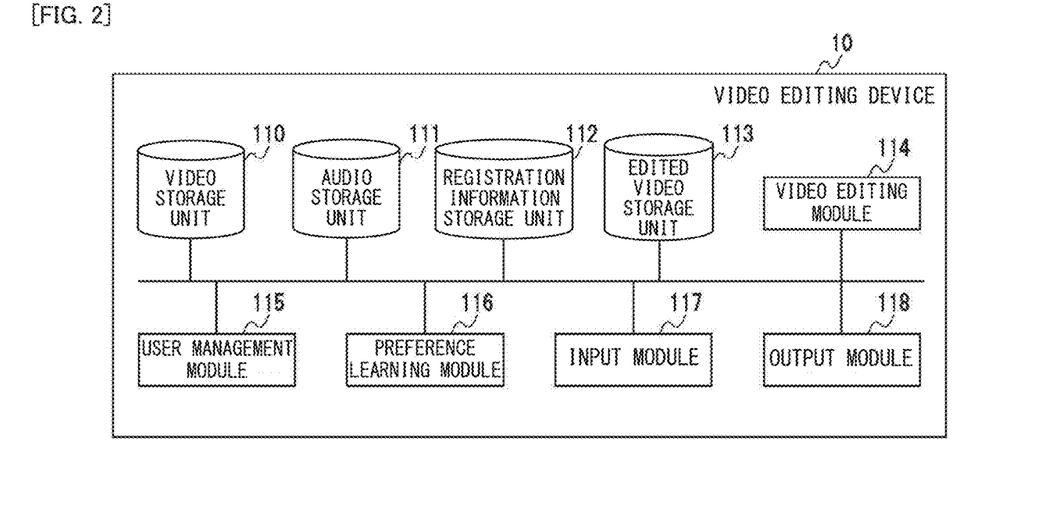
FIG. 2 is a functional block diagram of a video editing device.

FIG. 2 is a functional block diagram of the video editing device 10. Functional blocks of FIG. 2 may be implemented by the CPU 101 executing a computer program, and may be at least partially implemented by hardware. The video editing device 10 functions as a video storage unit 110, an audio storage unit 111, a registration information storage unit 112, an edited video storage unit 113, a video editing module 114, a user management module 115, a preference learning module 116, an input module 117, and an output module 118. In short, the computer components are operated as the above-mentioned functional blocks.

The video storage unit 110, the audio storage unit 111, the registration information storage unit 112, and the edited video storage unit 113 are implemented by the CPU 101 and the storage 104. The video editing module 114, the user management module 115, and the preference learning module 116 are implemented by CPU 101. The input module 117 and the output module 118 are implemented by the CPU 101 and the communication interface 105.

The video storage unit 110 stores a plurality of pieces of video data. The plurality of pieces of video data include raw videos captured by a plurality of video cameras installed in one event venue. Those raw videos are raw videos that were used when a commercial video work relating to an event was created (edited), and are unedited raw videos that were used in an edited video (first edited video) edited based on a professional editing standard by a creator. Hitherto, it has been common that such unedited raw videos are discarded after the creation of the video work.

Figure 3:
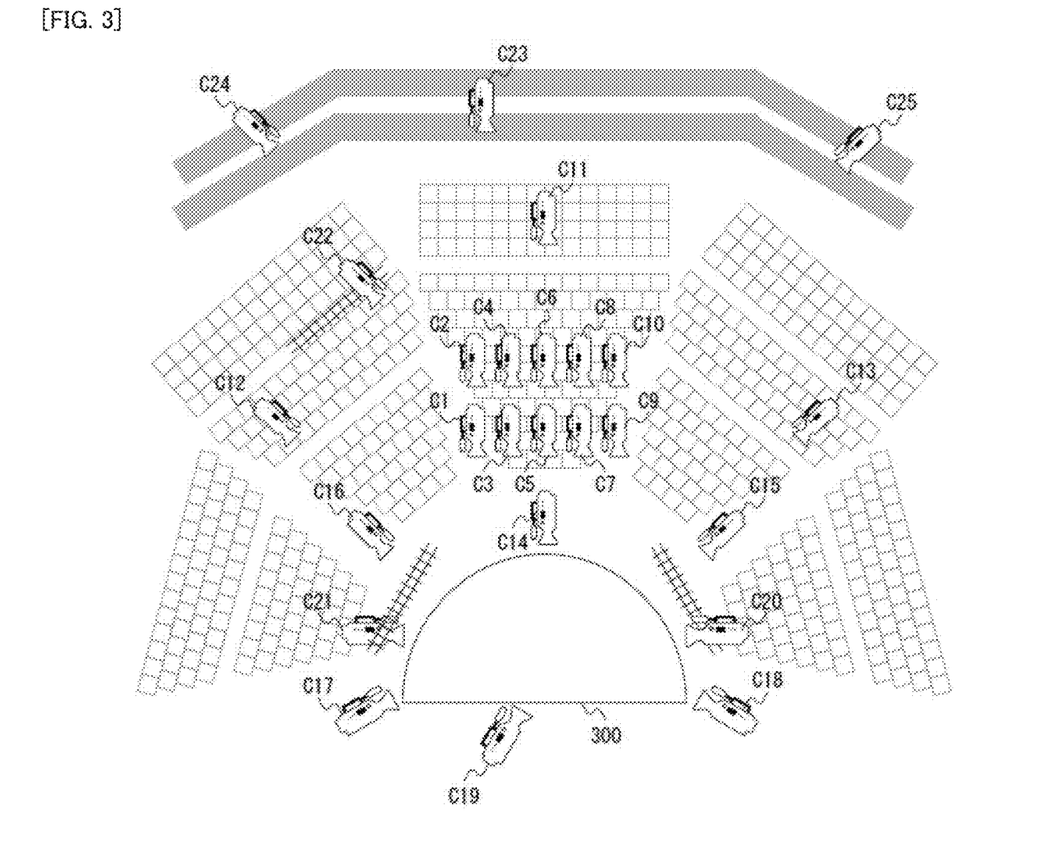
FIG. 3 is an explanatory diagram of video data acquisition.

FIG. 3 is an explanatory diagram of video data acquisition. FIG. 3 is an illustration of an arrangement example of a plurality of video capturing devices (video cameras C1 to C25) used in a concert venue. The video cameras C1 to C25 are arranged so as to capture videos of a stage 300 from various angles. In a case of this example, the video cameras C1 to C16 capture videos of the stage 300 from audience seats. The video cameras C17 to C19 are used on the stage 300. The video cameras C20 to C22 are installed on special equipment such as cranes to capture videos of the stage 300. The video camera C23 captures videos of the stage 300 from the center, the video camera C24 captures videos of the stage 300 from the right side, and the video camera C25 captures videos of the stage 300 from the left side.

The video cameras C1 to C25 are each assigned a role. In this example, the video cameras C1, C3, C5, C7, and C9 each capture videos of a close-up of a face of a specific performer. The video cameras C2, C4, C6, C8, and C10 each capture videos of an entire body of a specific performer. The video cameras C11 to C13 capture videos of all performers. The video cameras C14 to C16 capture videos of a performer singing as a lead singer. The video cameras C17 and C18 capture videos of the other performers (members) on the stage 300 from a short distance. The video camera C19 captures videos of players. In addition to the video cameras C1 to C25, video cameras for capturing videos of the members in dressing rooms may be used.

The videos captured by the respective video cameras C1 to C25 are used for creation of the video work by the creator as the raw videos, and then stored in the video storage unit 110 of the storage 104. Simultaneously with the video capturing performed by the video cameras C1 to C25, a sound is recorded by a sound collecting device in the concert venue (event venue). Audio data including the recorded sound is stored in the audio storage unit 111.

The registration information storage unit 112 stores registration data including registration information on a user who instructs the editing of the raw videos stored in the video storage unit 110 through the user terminal 20. The edited video storage unit 113 stores edited video data including an edited video created through editing as instructed by the user.

Figure 4:
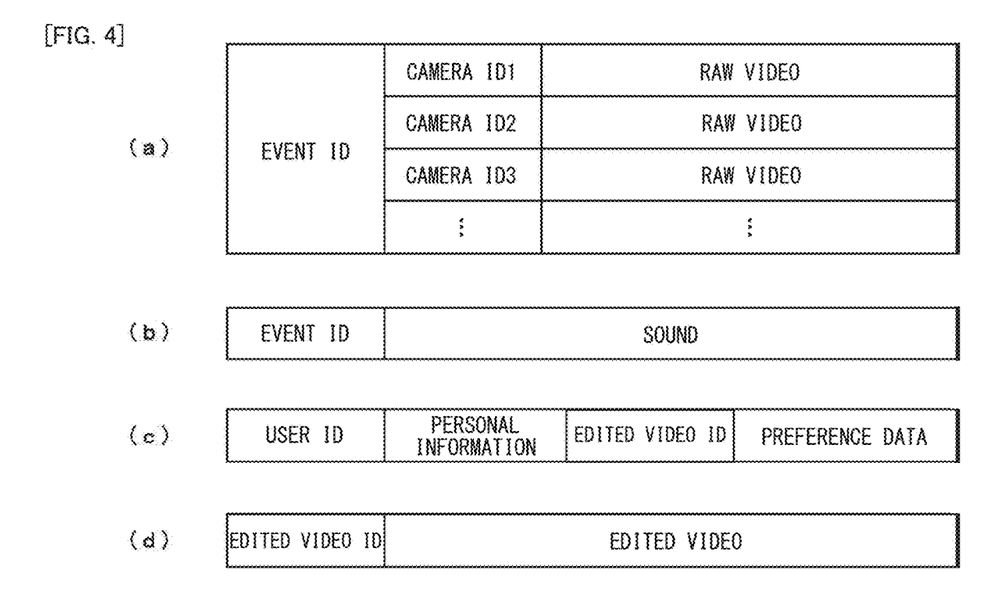
FIG. 4(a), FIG. 4(b), FIG. 4(c), and FIG. 4(d) are exemplary diagrams of data structure.

FIG. 4 are exemplary diagrams of data structure of respective pieces of data stored in the video storage unit 110, the audio storage unit 111, the registration information storage unit 112, and the edited video storage unit 113. FIG. 4(a) is an exemplary configuration diagram of the video data stored in the video storage unit 110. FIG. 4(b) is an exemplary configuration diagram of the audio data stored in the audio storage unit 111. FIG. 4(c) is an exemplary configuration diagram of the registration data stored in the registration information storage unit 112. FIG. 4(d) is an exemplary configuration diagram of the edited video data stored in the edited video storage unit 113.

The video data of FIG. 4(a) is structured such that a raw video is assigned an event ID for identifying an event in which the raw video was captured and a camera ID for identifying a video camera that captured the raw video. The raw video can be identified by the event ID and the camera ID as to which event was captured in the video by which video camera.

Most of raw videos obtained by capturing videos of concerts have a playback time of about two hours. A performer appearing in a raw video changes depending on a scene. For that reason, the raw video has each scene tagged so that the performer and his or her facial expression appearing in that scene can be indicated or grasped. At that time, when there are a plurality of performers appearing on one screen, tagging is performed so that a performer positioned as close to the center as possible and appearing as large as possible can be indicated, or tagging is performed so that all the performers can be indicated. The raw videos are assigned such tags and playback times as metadata.

The audio data of FIG. 4(b) is structured such that a sound is assigned an event ID for identifying an event in which the sound was recorded. The video data and the audio data are linked to each other by the event ID. During playback, the video and the sound are played back in synchronization with each other. A synchronizing signal for that purpose is included in the video data and the audio data.

The registration data of FIG. 4(c) is structured such that personal information (registration information) on a user is assigned a user ID for identifying the user and an edited video ID for identifying an edited video created by that user. Preference data representing the preference of that user, which is described later, is added to the registration data. The personal information on the user is input by the user through the operating unit 205 of the user terminal 20.

The video editing device 10 causes the user management module 115 to manage the registration information storage unit 112. The user management module 115 creates registration data by assigning a user ID to the personal information on the user which has been acquired from the user terminal 20, and stores the registration data in the registration information storage unit 112. Examples of the personal information include a name of the user, contact information on the user, and a login password. The edited video ID is assigned in order to identify an edited video when the user has created the edited video by originally editing raw videos. The edited video ID is added to the registration data each time the user creates an edited video.

The edited video data of FIG. 4(d) is structured such that an edited video created by a user is assigned an edited video ID. The video editing module 114 stores, in the edited video storage unit 113, the edited video data created by assigning an edited video ID to the edited video. When the edited video is assigned an edited video ID, the user management module 115 adds the edited video ID to the registration data on the user who has created the edited video. The registration data and the edited video are linked to each other by the edited video ID. It suffices that the edited video can be played back, and in addition to a video itself, the edited video may be configured by, for example, combining pieces of information indicating scenes of raw videos used in the edited video. The edited video may be a combination of playback times and pieces of information that specify scenes of raw videos that are used, for example, an instruction of a scene of a first raw video during a playback time of from 0 seconds to 5 seconds, an instruction of a scene of a second raw video during a playback time of from 5 seconds to 8 seconds, and so on.

The video editing module 114 edits the plurality of raw videos stored in the video storage unit 110 based on an editing standard (second editing standard) included in the editing instruction acquired from the user terminal 20, and creates an edited video that matches the preference of the user. The video editing module 114 analyzes raw videos before creating an edited video, and identifies performers in the videos scene by scene through, for example, a face recognition technology. The video editing module 114 tags the raw videos as described above so that the identified performers can be indicated.

The video editing module 114 uses an editing standard and tags added to each raw video to determine a video that matches the editing standard, and extracts such videos from a plurality of raw videos. The video editing module 114 creates one edited video by combining the extracted videos. The video editing module 114 calculates, for example, a degree of matching with the editing standard for each scene of each raw video. The video editing module 114 extracts a raw video having the highest degree of matching for each scene to create an edited video. At that time, when there is preference data on the user, the video editing module 114 may calculate the degree of matching through use of the preference data and the editing standard. With the preference data taken into consideration, an edited video that more closely matches the preference of the user is automatically obtained.

The edited video is transmitted to the user terminal 20, and is assigned an edited video ID to be stored in the edited video storage unit 113.

The preference learning module 116 learns the preference of a user through use of editing standards and edited videos as teacher data. The preference learning module 116 acquires an editing standard acquired from the user terminal 20 and an edited video created based on the editing standard. The preference learning module 116 performs machine learning based on the acquired editing standard and edited video, and creates preference data on the user. The user management module 115 adds the preference data to the registration data on the user. The preference learning module 116 performs the machine learning and updates the preference data each time the user instructs to create an edited video. Therefore, as the user creates more edited videos, an edited video that more closely matches the preference of the user is created.

The input module 117 acquires an instruction such as an editing instruction transmitted from the user terminal 20. The output module 118 transmits, to the user terminal 20, the edited video data representing the edited video and the audio data corresponding to the edited video.

<User Terminal>

Figure 5:
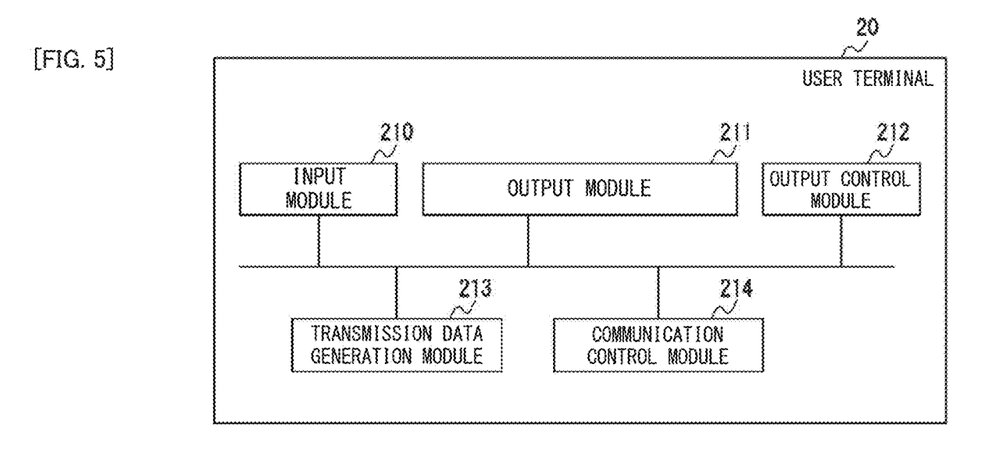
FIG. 5 is a functional block diagram of a user terminal.

Next, a configuration example of the user terminal 20 is described. FIG. 5 is a functional block diagram of the user terminal 20. Functions of FIG. 5 may be implemented by the CPU 201 executing a computer program, and may be at least partially implemented by hardware. In this embodiment, an example in which each function is implemented by installing application software for creating an edited video through use of the video editing device 10 in the user terminal 20 and executing the application software is described.

The user terminal 20 functions as an input module 210, an output module 211, an output control module 212, a transmission data generation module 213, and a communication control module 214. In short, the user terminal 20 operates as such functional blocks. The input module 210 is implemented by the CPU 201 and the operating unit 205. The output module 211 is implemented by the CPU 201, the display 206, and the speaker 207. The output control module 212 and the transmission data generation module 213 are implemented by the CPU 201. The communication control module 214 is implemented by the CPU 201 and the communication interface 204.

The input module 210 receives an instruction and the like input by the user through the operating unit 205. Under the control of the output control module 212, the output module 211 displays a screen on the display 206, and outputs a sound from the speaker 207. The transmission data generation module 213 generates transmission data to be transmitted to the video editing device 10 based on the instruction and the like received by the input module 210.

Figure 6:
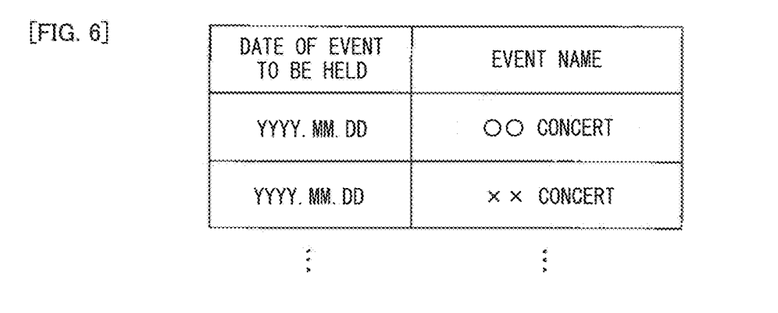
FIG. 6 is an exemplary view of a selection screen.

Processing for generating an editing instruction as transmission data to be transmitted to the video editing device 10 is described. In this case, the output control module 212 displays on the display 206 an operation screen for creating an edited video through use of the video editing device 10. When the application software for creating an edited video through use of the video editing device 10 is executed, a selection screen for selecting which raw video of which event is to be edited is first displayed on the display 206. FIG. 6 is an exemplary view of the selection screen. On the selection screen, an event name and a date of an event to be held are displayed. The user uses the operating unit 205 to select, from the selection screen, an event to be edited.

Figure 7:
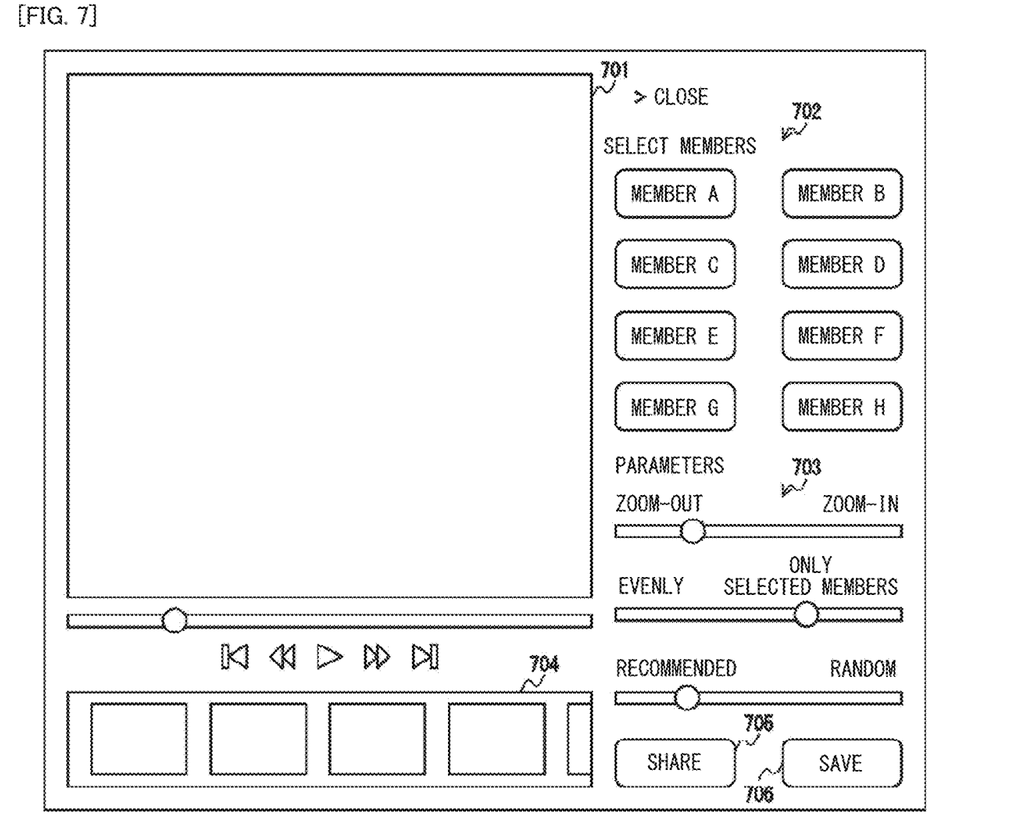
FIG. 7 is an exemplary view of an operation screen.

When an event is selected, an operation screen for setting an editing standard is displayed on the display 206. FIG. 7 is an exemplary view of the operation screen for this case. The operation screen includes a main viewer 701, member selection buttons 702, parameter adjustment bars 703, a merchandise sales field 704, a share button 705, and a save button 706. An edited video is displayed in the main viewer 701. The member selection buttons 702 and the parameter adjustment bars 703 are used by the user to input a desired editing standard. The merchandise sales field 704 is a field for introducing goods relating to the event selected on the selection screen, and is linked to a sales website of the related goods.

The user selects desired members through use of the member selection buttons 702. The members selected through the member selection buttons 702 are performers of the event. The user can use the parameter adjustment bars 703 to set appearances (zoom-out or zoom-in) of the desired members, appearances of other members, recommended videos, and the like. The transmission data generation module 213 uses those settings as an editing standard to create an editing instruction.

The communication control module 214 communicates to/from the video editing device 10. For example, the communication control module 214 transmits the editing instruction to the video editing device 10. The communication control module 214 acquires the edited video data and audio data that have been edited based on the editing instruction from the video editing device 10, and transmits the edited video data and the audio data to the output control module 212. The output control module 212 displays the edited video based on the acquired edited video data in the main viewer 701, and outputs the sound based on the acquired audio data from the speaker 207. This enables the user to play the edited video that matches the user's own preference.

<Video Editing>

An example of video editing performed by the video editing system 1 as described above is described. The video editing is performed by the video editing module 114 as described above. Now, a case in which a zoom-in image of "MEMBER A" is set as an editing standard is described.

Figure 8:
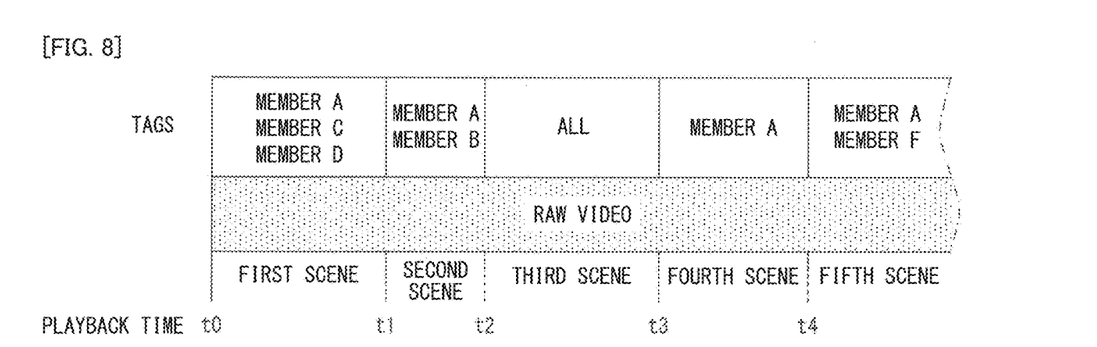
FIG. 8 is an explanatory diagram of tagging.

The video editing module 114 learns facial images of each member in advance, and extracts the member from each raw video through a face recognition technology. For example, the video editing module 114 extracts members from each scene of the raw video. The video editing module 114 determines that the scene has changed, for example, each time members included in the video changes. The video editing module 114 tags the extracted members to the scene of the raw video. FIG. 8 is an explanatory diagram of a case in which members are tagged to a raw video.

The raw video of FIG. 8 is a video captured by a video camera for mainly capturing videos of the member A. In FIG. 8, a first scene (playback time from t0 to t1) is tagged with "MEMBER A," "MEMBER C," and "MEMBER D." A second scene (playback time from t1 to t2) is tagged with "MEMBER A" and "MEMBER B." A third scene (playback time from t2 to t3) is tagged with "ALL MEMBERS." A fourth scene (playback time from t3 to t4) is tagged with "MEMBER A." A fifth scene (playback time from t5) is tagged with "MEMBER A" and "MEMBER F."

Figure 9:
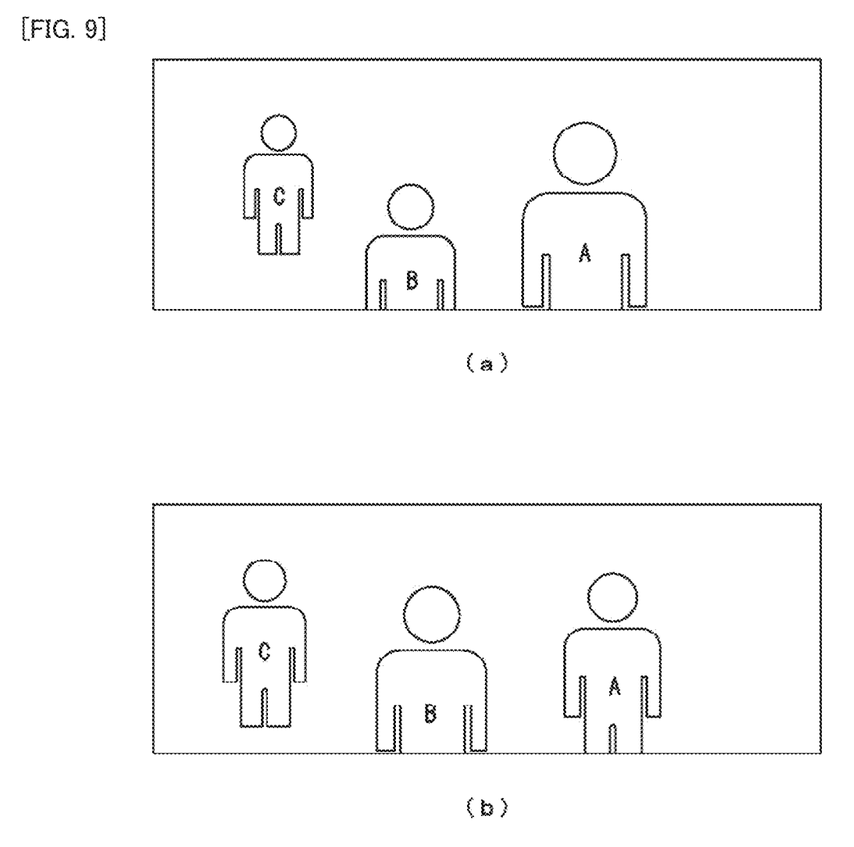
FIG. 9(a) and FIG. 9(b) are explanatory diagrams of scene extraction.

The video editing module 114 that has tagged all the raw videos performs editing to obtain an edited video based on the editing standard. When the member A is designated as the editing standard, a video (scene) including the member A is extracted from each raw video to create an edited video. FIG. 9 are explanatory diagrams of scene extraction. FIG. 9(a) and FIG. 9(b) are videos captured by different video cameras at the same timing. Each video contains the three members A, B, and C.

In this case, in the video of FIG. 9(a), the member A is displayed in the largest size, while in the video of FIG. 9(b), the member A is displayed in the second largest size. The video editing module 114 calculates the degree of matching with the editing standard for each video. The editing standard is the zoom-in image of "MEMBER A," and hence the degree of matching of FIG. 9(a) has a value higher than that of the degree of matching of FIG. 9(b). Therefore, the video editing module 114 extracts a scene including the video of FIG. 9(a). At this time, the video editing module 114 may add the preference data on the user to a standard of the degree of matching. For example, when the user prefers the member A to appear in the center of a video, the degree of matching also includes the position of the member A in addition to the size of member A in a video.

Figure 10:
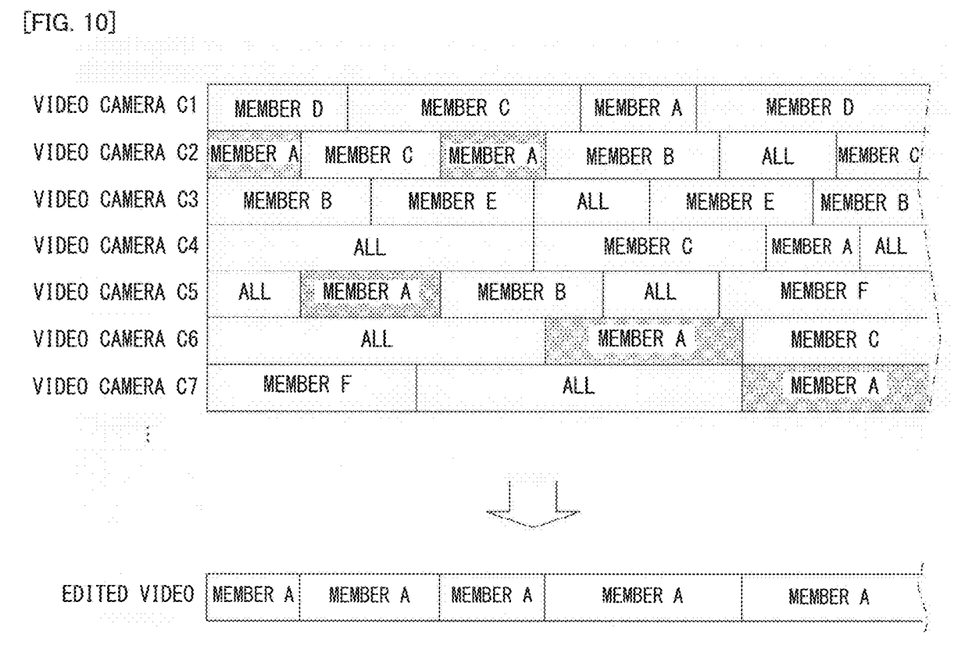
FIG. 10 is an explanatory diagram of edited videos.

The video editing module 114 creates an edited video by combining scenes extracted from the raw videos in this manner. FIG. 10 is an explanatory diagram of an edited video in which such scenes are combined. In FIG. 10, a plurality of raw videos obtained from a plurality of video cameras are assigned tags of members appearing therein scene by scene. The video editing module 114 uses the tags to automatically create an edited video that matches the editing standard.

When the editing standard is "MEMBER A," the video editing module 114 imports and combines scenes tagged with "MEMBER A" from the raw videos to create an edited video. When the member A is tagged at the same timing in a plurality of raw videos, the video editing module 114 selects a scene to be imported based on such a degree of matching as described with reference to FIG. 9. The edited video of FIG. 10 is constructed by selecting scenes indicated by being shaded from the raw videos. With a professional editing standard which has hitherto been adopted, a video work is completed by selecting scenes in which the members evenly appear. In contrast, under the editing standard based on the preference of the user as in this embodiment, an edited video in which the members unevenly appear is created.

<Video Editing Sequence>

Figure 11:
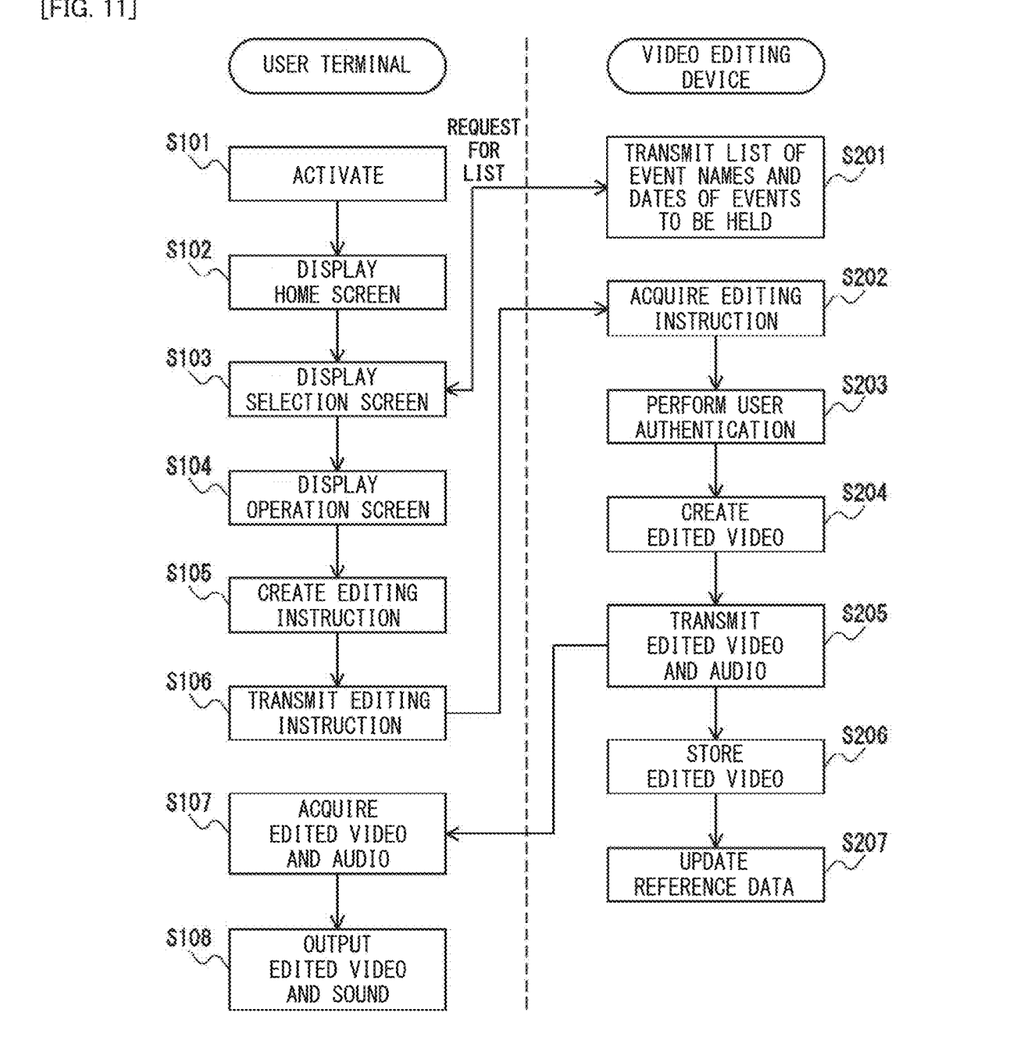
FIG. 11 is a sequence diagram of a video editing sequence.

A video editing sequence performed by the video editing system 1 having the above-mentioned configuration is described. FIG. 11 is a sequence diagram of the video editing sequence. As a premise, the user has been registered as a user, and a plurality of raw videos are stored in the video storage unit 110.

Figure 12:
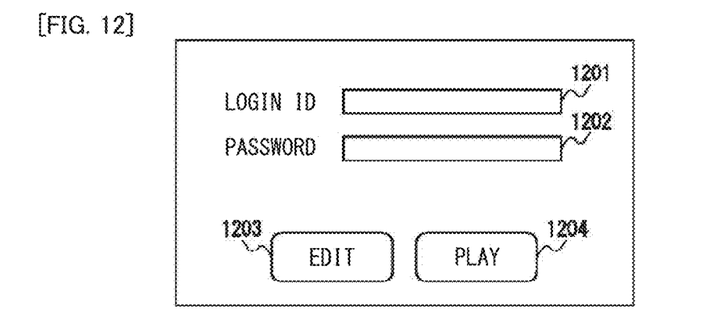
FIG. 12 is an exemplary view of a home screen.

The user uses the user terminal 20 to activate the application software for creating an edited video through use of the video editing device 10 (Step S101). Through the activation of the application software, a home screen is displayed on the display 206 of the user terminal 20 (Step S102). FIG. 12 is an exemplary view of the home screen. The home screen includes a "LOGIN ID" field 1201, a "PASSWORD" field 1202, an "EDIT" button 1203, and a "PLAY" button 1204. The user uses the operating unit 205 to input a login ID in the "LOGIN ID" field 1201, and input a password in the "PASSWORD" field 1202. After that, the user selects any one of the "EDIT" button 1203 and the "PLAY" button 1204 through use of the operating unit 205. To perform the video editing, the user selects the "EDIT" button 1203.

When the user selects the "EDIT" button 1203 from the home screen through use of the operating unit 205, the selection screen of FIG. 6 is displayed on the display 206 (Step S103). At this time, the user terminal 20 requests the video editing device 10 for a list of event names and dates of events to be held which relate to the raw videos stored in the video storage unit 110. In response to this request, the video editing device 10 transmits the list of event names and dates of events to be held to the user terminal 20 (Step S201). Thus, the user terminal 20 acquires the list of event names and dates of events to be held. The user selects an event to be edited from the selection screen through use of the operating unit 205. When the user selects an event to be edited from the selection screen through use of the operating unit 205, the operation screen of FIG. 7 is displayed on the display 206 (Step S104).

The user selects desired editing conditions from the operation screen through use of the operating unit 205. In the example of FIG. 7, the user uses the member selection buttons 702 and the parameter adjustment bars 703 to set desired members, the appearances of the desired members, and the like. The transmission data generation module 213 uses those settings as an editing standard to create an editing instruction. The transmission data generation module 213 generates an editing instruction including the editing standard based on the selected conditions (Step S105). The editing instruction also includes the user ID of the user and the password which have been input on the home screen. The user terminal 20 causes the communication control module 214 to transmit the editing instruction generated by the transmission data generation module 213 to the video editing device 10 through the network N (Step S106).

The video editing device 10 causes the input module 117 to acquire the editing instruction transmitted from the user terminal 20 (Step S202). The video editing device 10 causes the user management module 115 to refer to the registration data to perform user authentication through use of the user ID and the password that are included in the editing instruction (Step S203). The following processing is executed when user authentication is successful. When the user authentication has failed, the video editing device 10 transmits, to the user terminal 20, a notification that prompts the user to input the user ID and the password again, and performs the user authentication again.

The video editing device 10 causes the video editing module 114 to edit raw videos based on the editing standard included in the editing instruction as described above to create an edited video (Step S204). The video editing device 10 causes the output module 118 to transmit the edited video data representing the edited video and the audio data on the corresponding sound to the user terminal 20 through the network N (Step S205).

The video editing module 114 also adds the user ID to the created edited video and stores the edited video in the edited video storage unit 113 (Step S206). The video editing device 10 causes the preference learning module 116 to learn the editing standard acquired in the current processing and the created edited video to generate preference data, and add the preference data to the corresponding registration data in the registration information storage unit 112. When the preference data has already been added to the registration data, the preference data is updated (Step S207).

The user terminal 20 causes the communication control module 214 to acquire the edited video data and the audio data that have been transmitted from the video editing device 10 (Step S107). The output control module 212 of the user terminal 20 converts the edited video data and the audio data into formats that can be output, and the output module 211 outputs the converted data (Step S108). The output module 211 displays the edited video on the display 206, and outputs the sound from the speaker 207.

Figure 13:
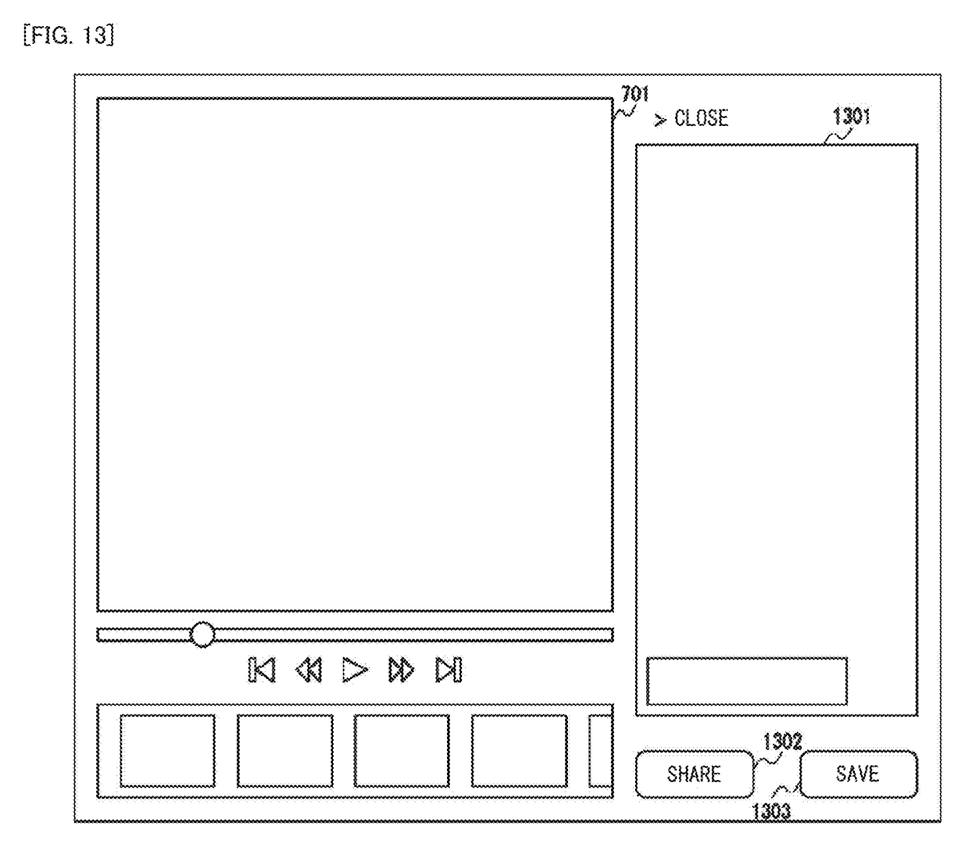
FIG. 13 is an exemplary view of a display screen.

The edited video may be displayed in the main viewer 701 of the operation screen of FIG. 7, but may be displayed on another display screen. FIG. 13 is an exemplary view of a display screen for displaying the edited video. The display screen is displayed by being switched from the operation screen of FIG. 7 after the editing instruction is transmitted from the user terminal 20 to the video editing device 10 in the processing step of Step S106. The display screen includes a main viewer 701, a comment field 1301, a share button 1302, and a save button 1303. The edited video is displayed in the main viewer 701.

The user can share the edited video being displayed with another user by pressing the share button 1302. When the edited video is shared, comments of the user and another user can be displayed in the comment field 1301. The user can save the edited video being displayed in the user terminal 20 by pressing the save button 1303. Whether or not the video editing device 10 is to store the edited video in the processing step of Step S206 may be determined through the pressing of the save button 1303.

The display screen of FIG. 13 is also displayed when the "PLAY" button 1204 of FIG. 12 is selected. In this case, the user can view not only the edited video created by himself or herself but also the edited video created by another user and set to be shared.

Figure 14:
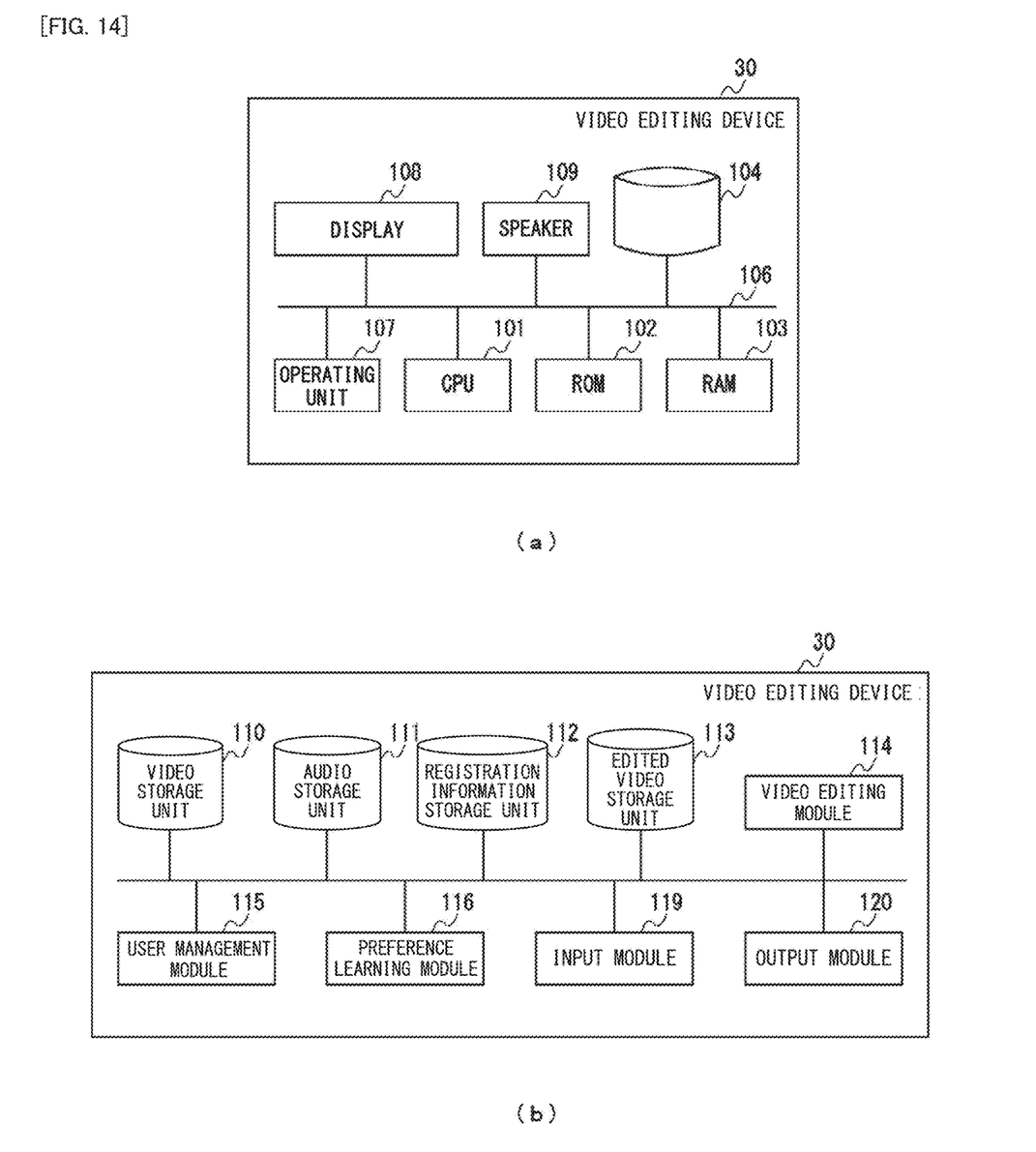
FIG. 14(a) and FIG. 14(b) are explanatory diagrams of a configuration of a video editing device according to a modification example of the present disclosure.

FIG. 14 represents explanatory diagrams of a configuration of a video editing device according to a modification example of the present disclosure. FIG. 14(a) is an illustration of a hardware configuration of a video editing device 30, and FIG. 14(b) is an illustration of functional blocks of the video editing device 30. The video editing device 30 has a configuration obtained by integrating the video editing device 10 and the user terminal 20, which are illustrated in FIG. 1.

The video editing device 30 has a configuration obtained by adding an operating unit 107, a display 108, and a speaker 109 to the video editing device 10 of FIG. 1. The operating unit 107 is an input interface having the same function as that of the operating unit 205 of the user terminal 20 of FIG. 1. The display 108 has the same function as that of the display 206 of the user terminal 20 of FIG. 1, but is a display device with a screen size, image quality, and the like having been improved. The speaker 109 has the same function as that of the speaker 207 of the user terminal 20 of FIG. 1, but has higher sound quality.

The video editing device 30 has the same configuration as that including the functional blocks of the video editing device 10 of FIG. 2 except for an input module 119 and an output module 120 having different functions. That is, the input module 119 receives an instruction such as an editing instruction directly from the operating unit 107 without intermediation of the network N. The output module 120 outputs the edited video and the sound directly from the display 108 and the speaker 109 without transmitting the edited video data and the audio data through the network N.

The video editing device 30 may also be able to record the edited video on a recording medium and provide the recording medium to the user. In this case, the video editing device 30 includes a device for writing data to a recording medium such as a USB flash drive, a DVD, and Blu-ray (trademark). After the edited video is created by the video editing device 30, the user instructs the video editing device 30 to write the edited video to the recording medium. The video editing device 30 writes the edited video to the recording medium in response to this instruction. The recording medium created in this manner is provided to the user, and is to be used by the user.

The video editing device 30 as described above is installed in, for example, a dedicated facility equipped with the latest display 108 and speaker 109. Even when a high-performance personal computer is used as the user terminal 20, there is a limit to a sense of presence that the user gets. In contrast, when the video editing device 30 is installed in, for example, a dedicated facility, the user can enjoy the edited video with high image quality, high sound quality, and a high sense of presence.

The video editing system 1 as described above enables effective utilization of unedited raw videos that have hitherto been only supposed to be discarded or kept idle. For example, the user can edit the raw videos based on a unique editing standard different from the professional editing standard, and thus can customize and enjoy an event such as a concert as a unique video work that matches his or her own preference. Therefore, the user can continuously enjoy even the same event from different a point of view. In addition, the user can compare the video work edited by himself or herself to the video work edited by another user, and the user and another user can evaluate those video works with each other.

The invention claimed is:

1. A video editing device, comprising:
   a video storage unit for storing in an unedited state a plurality of raw videos obtained by capturing videos of one event by a plurality of video capturing devices and used for creation of a video work of the one event;
   a registration information storage unit configured to store registration information of a user who operates a user terminal for inputting an editing standard;
   an editing unit for creating an edited video of the one event through use of the plurality of raw videos as requested by a user, wherein the editing unit is configured to:
   (i) add metadata that allows content appearing in each scene to be indicated to each of the plurality of raw videos stored in the video storage unit;
   (ii) calculate degrees of matching between the editing standard and the plurality of raw videos based on the metadata, the degrees of matching being calculated using both preference data and the editing standard, when the preference data of the user who has input the editing standard is available; and
   (iii) create the edited video of the one event through use of some extracted ones of the plurality of raw videos based on the degrees of matching, the editing standard and the preference data;
   a learning unit configured to learn the preference data based on the edited video and the editing standard input by the user, the preference data being based on the user and used for creation of the edited video, and the editing standard including user-selection of performer of the one event and selection of appearance of the selected performer or other performer.

2. The video editing device according to claim 1, wherein the editing unit is configured to: calculate a degree of matching of each scene with the editing standard for each of the plurality of raw videos; extract a raw video having a highest degree of matching for each scene; and create the edited video through use of the extracted raw videos.

3. The video editing device according to claim 1,
   wherein the editing unit has learned facial images of a person appearing in the plurality of raw videos in advance; and
   wherein the editing unit is configured to:
   extract a person in each scene from each of the plurality of raw videos through a face recognition technology;
   assign a tag of the extracted person to the each scene; and
   calculate the degree of matching with the editing standard based on the tag assigned to the each scene.

4. The video editing device according to claim 1, further comprising:
   an edited video storage unit configured to store the edited video in association with the registration information on the user who has input the editing standard for creating the edited video; and
   a video output unit for enabling the edited video to be output to a user terminal of another user.

5. The video editing device according to claim 1, further comprising:
   a recorded audio data storing unit for storing recorded audio data recorded in synchronization with the raw videos; and
   an output unit operating to output the edited video, with the recorded audio data that is recorded in synchronization with the raw videos used in the edited video.

6. The video editing device according to claim 5, further comprising an input unit for acquiring the editing standard, which is specific to the user, from the user terminal, wherein the output unit operates to output the edited video to the user terminal.

7. The video editing device according to claim 1, further comprising:
a recorded audio data storage unit for storing recorded audio data recorded in synchronization with the plurality of raw videos;
a display unit configured to display the edited video that has been created; and
a sound output unit configured to extract, when the edited video is displayed on the display unit, recorded audio data included in the edited video from the recorded audio data storage unit, and outputting the recorded audio data to a predetermined speaker.

8. A video editing method, comprising:
storing, in an unedited state, a plurality of raw videos obtained by capturing videos of one event by a plurality of video capturing devices and used for creation of a video work of the one event;
storing registration information of a user who operates a user terminal for inputting an editing standard;
creating an edited video of the one event through use of the plurality of raw videos as requested by a user, by carrying out the following actions:
adding metadata that allows content appearing in each scene to be indicated to each of the plurality of raw videos stored;
acquiring the editing standard;
calculating degrees of matching between the editing standard and the plurality of raw videos based on the metadata, the degrees of matching being calculated using both preference data and the editing standard, when the preference data of the user who has input the editing standard is available;
creating the edited video of the one event through use of some extracted ones of the plurality of raw videos based on the degrees of matching, the editing standard and the preference data; and
learning the preference data based on the edited video and the editing standard input by the user, the preference data being based on the user and used for creation of the edited video, and the editing standard including user-selection of performer of the one event and selection of appearance of the selected performer or other performer.

9. A non-transitory, computer readable storage medium containing a computer program, which when executed by a computer, causes the computer to carry out actions, comprising:
storing, in an unedited state, a plurality of raw videos obtained by capturing videos of one event by a plurality of video capturing devices and used for creation of a video work of the one event;
storing registration information of a user who operates a user terminal for inputting an editing standard;
creating an edited video of the one event through use of the plurality of raw videos as requested by a user, by carrying out the following actions:
adding metadata that allows content appearing in each scene to be indicated to each of the plurality of raw videos stored;
acquiring the editing standard;
calculating degrees of matching between the editing standard and the plurality of raw videos based on the metadata, the degrees of matching being calculated using both preference data and the editing standard, when the preference data of the user who has input the editing standard is available; and
creating the edited video of the one event through use of some extracted ones of the plurality of raw videos based on the degrees of matching, the editing standard and the preference data; and
learning the preference data based on the edited video and the editing standard input by the user, the preference data being based on the user and used for creation of the edited video, and the editing standard including user-selection of performer of the one event and selection of appearance of the selected performer or other performer.

* * * * *